US006386894B2

(12) United States Patent
Carr

(10) Patent No.: US 6,386,894 B2
(45) Date of Patent: May 14, 2002

(54) VERSATILE INTERCONNECTION SCHEME FOR BEVERAGE QUALITY AND CONTROL SENSORS

(75) Inventor: Richard A. Carr, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/778,985

(22) Filed: Feb. 7, 2001

Related U.S. Application Data

(60) Provisional application No. 60/200,196, filed on Apr. 28, 2000.

(51) Int. Cl.[7] .................................................. H01R 4/60

(52) U.S. Cl. ..................................... 439/191; 222/129.1

(58) Field of Search ................................ 439/191, 190, 439/194, 195, 289; 222/129.1, 146, 66

(56) References Cited

U.S. PATENT DOCUMENTS 3,625,402 A * 12/1971 Kulis ...................... 222/129.3
3,800,826 A * 4/1974 McCann ..................... 137/560
4,676,401 A * 6/1987 Fox et al. ...................... 222/1
5,123,856 A * 6/1992 Brinkmann ................. 439/289
6,234,223 B1 * 5/2001 Nelson ....................... 141/264

* cited by examiner

*Primary Examiner*—Brian Sircus
*Assistant Examiner*—Brian S. Webb
(74) *Attorney, Agent, or Firm*—Dwight N. Holmbo; Wade James Brady, III; Frederick J. Telecky, Jr.

(57) ABSTRACT

Method and apparatus for electrically interconnecting a sensor (104) in a beverage dispensing apparatus (102) to a sensor control system contained within a separate unit concurrent with attachment of said beverage dispensing apparatus to said separate unit are disclosed, comprising locking members (114) disposed on the beverage dispensing apparatus, a base plate (200) on the separate unit having receptacles (210) adapted to matably engage and align the beverage dispensing apparatus, a plurality of base plate conductor members (212), disposed on the lower surface of the base plate and electrically coupled to the sensor control system, a plurality of dispenser apparatus conductor members (118), electrically coupled (202) to the sensor and disposed on an upper surface (112) of the beverage dispensing apparatus such that as the beverage dispensing apparatus is matably engaged with the base plate the conductor members are brought into alignment and communicative contact.

11 Claims, 2 Drawing Sheets

100 114 118 118 102 108 104 110 118 106 118 116 118 112 118 118 114 208

210 210 200 212 212 212 212 214 114 114 118 118 100 112 208 202 202 202 116 104 102 202 204 206

VERSATILE INTERCONNECTION SCHEME FOR BEVERAGE QUALITY AND CONTROL SENSORS

This application claims priority under 35 USC§ 119 (e)(1) of provisional application number 60/200,196, filed Apr. 28, 2000.

FIELD OF THE INVENTION

The present invention relates in general to beverage sensor systems and more particularly, to a versatile system for electrical interconnection of sensor components disposed in various beverage dispenser apparatus.

BACKGROUND OF THE INVENTION

The dispensing of fountain beverages is generally accomplished using either premix systems in which a finished beverage is delivered to a proprietor from a bottler, and postmix systems in which flavored syrup is delivered to the proprietor and mixed with water at the point of delivery.

A premix system generally utilizes product containers filled with finished soft drink which may be under carbon dioxide pressure. In these systems, the product is normally delivered to the consumer via a single orifice dispensing valve. Premix systems are also used in bottling plants which typically operate at extremely high flow rates. These systems are relatively expensive installations and are unsuitable for most typical food service settings.

A postmix system generally utilizes flavored syrup combined with carbonated or still water at a prescribed ratio and delivered through a dispensing valve at a fountain having passages for both syrup and water. The valve combines the syrup and water immediately before delivery into a cup on an individual serving basis. The valves are typically adjusted periodically to alter the mix ratio of the ingredients of the beverage.

Recently, beverage dispensing systems have utilized various sensor technology to measure or control mix ratios. Since it is desirable to have the sensing surface in immediate contact with the liquid being dispensed, rather than being sampled remotely, sensor components must be embedded within, or disposed upon, the dispensing apparatus, which is typically a plastic delivery nozzle. These sensor components must be electrically interconnected with sensor processing systems, typically disposed somewhere within the central housing of the entire dispensing unit. The dispenser nozzles and other apparatus must be removed periodically for cleaning. Most conventional nozzles are detached and reattached by rotating the nozzles a few degrees in either a clockwise or counter-clockwise direction. Therefore, any sensor componentry, and the electrical interconnections thereto, must be as readily removed and attached.

Conventional sensor interconnections, however, are typically cumbersome and not easily removed and attached. Most conventional systems require a user to decouple or secure the sensor interconnections independently of removing or attaching the nozzle. Furthermore, conventional sensor interconnections typically comprise multiple wires and connector components. For example, interconnection might be provided by means of a cable or edge card assembly. Aside from the inconvenience and inefficiency of handling numerous independent members, and the potential for improper or forgotten connection, those various members are susceptible to damage and wear during normal use, resulting in cost inefficiencies.

SUMMARY OF THE INVENTION

Therefore, method and apparatus for making simple electrical interconnections for sensors embedded in beverage dispensing apparatus, eliminating multiple wires and connectors and providing single-step attachment and removal is now needed; providing convenient and efficient performance while overcoming the aforementioned limitations of conventional methods.

The present invention provides electrical conductors integrated into a dispenser apparatus such that electrical to interconnection between a sensor in the dispenser apparatus and a remote sensor processing system is achieved as the dispenser apparatus is attached to a dispensing unit. In the present invention, electrical connection is thus engaged and disengaged concurrent with attachment and detachment of the dispensing apparatus, respectively.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

It should be understood that the principles and applications disclosed herein can be applied to sensor systems in a wide range of end equipment applications. For purposes of explanation and illustration, the present invention is hereafter described in reference to a beverage dispenser sensor system. However, the same approach may be used in a number of integrated and remote sensor applications.

Because dispensing apparatus (e.g. nozzles) in which a sensor component might be embedded require periodic removal, the present invention provides a simple and robust electrical interconnection scheme. The present invention provides a system for interconnection in which the engagement or disengagement of the electrical interconnection is concurrent with the attachment or removal of the dispensing apparatus, respectively.

Figure 1:
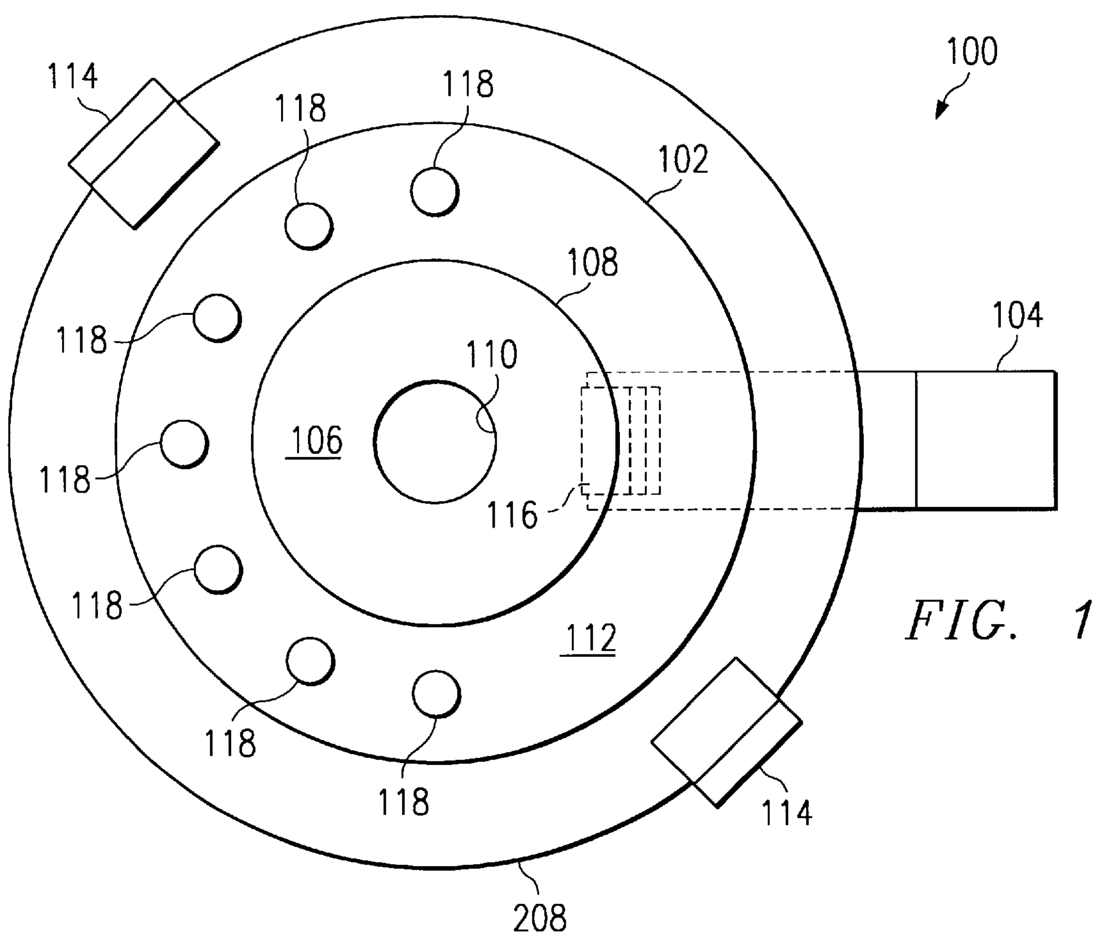
FIG. 1 is an illustrative top view schematic of a dispenser apparatus according to the present invention.

The present invention is now described in reference to FIG. 1, which depicts a top view of a nozzle and sensor assembly 100. Assembly 100 comprises nozzle 102 and sensor component 104. The inner channel 106 of nozzle 102 is bounded at its top by upper aperture 108 and at its bottom by lower aperture 110. Assembly 100 further comprises an outer flange 112, circumferentially disposed around the upper perimeter of nozzle 102 near upper aperture 108, and locking members 114, which are utilized to secure assembly 100 to a beverage dispensing unit (not shown). As shown, locking members 114 disposed at even intervals around the perimeter of flange 112. Locking members 114 may attached to or formed within flange 112, or alternatively, may be incorporated into a separate structure. Depending on particular design requirements, locking members 114 might also be disposed at irregular intervals around the perimeter of flange 112 or a separate structure. Sensor component 104 is coupled to nozzle 102 such that the sensing surface 116 of component 104 is disposed within inner channel 106 of nozzle 102. Surface 116 may thus achieve direct contact with any beverage or liquid dispensed through nozzle 102, sensing desired information or characteristics.

Assembly 100 further comprises one or more conductor members 118, disposed around the upper surface of flange 112. Conductor members 118 may be of a nail head configuration, and may formed by partially encasing a conductive material within the nozzle 102 or by depositing, via semiconductor processing techniques, conductive material on the upper surface of flange 112, or by any other suitable means. Alternatively, conductor members 118 may be spring loaded bearings, leaf springs, or some other suitable electrical contact configuration. Conductor members 118 provide electrical interconnection between component 104 and sensor processing systems, located external to assembly 100, typically disposed somewhere within the central housing of the entire dispensing unit. This is described in greater detail with reference now to FIG. 2.

Figure 2:
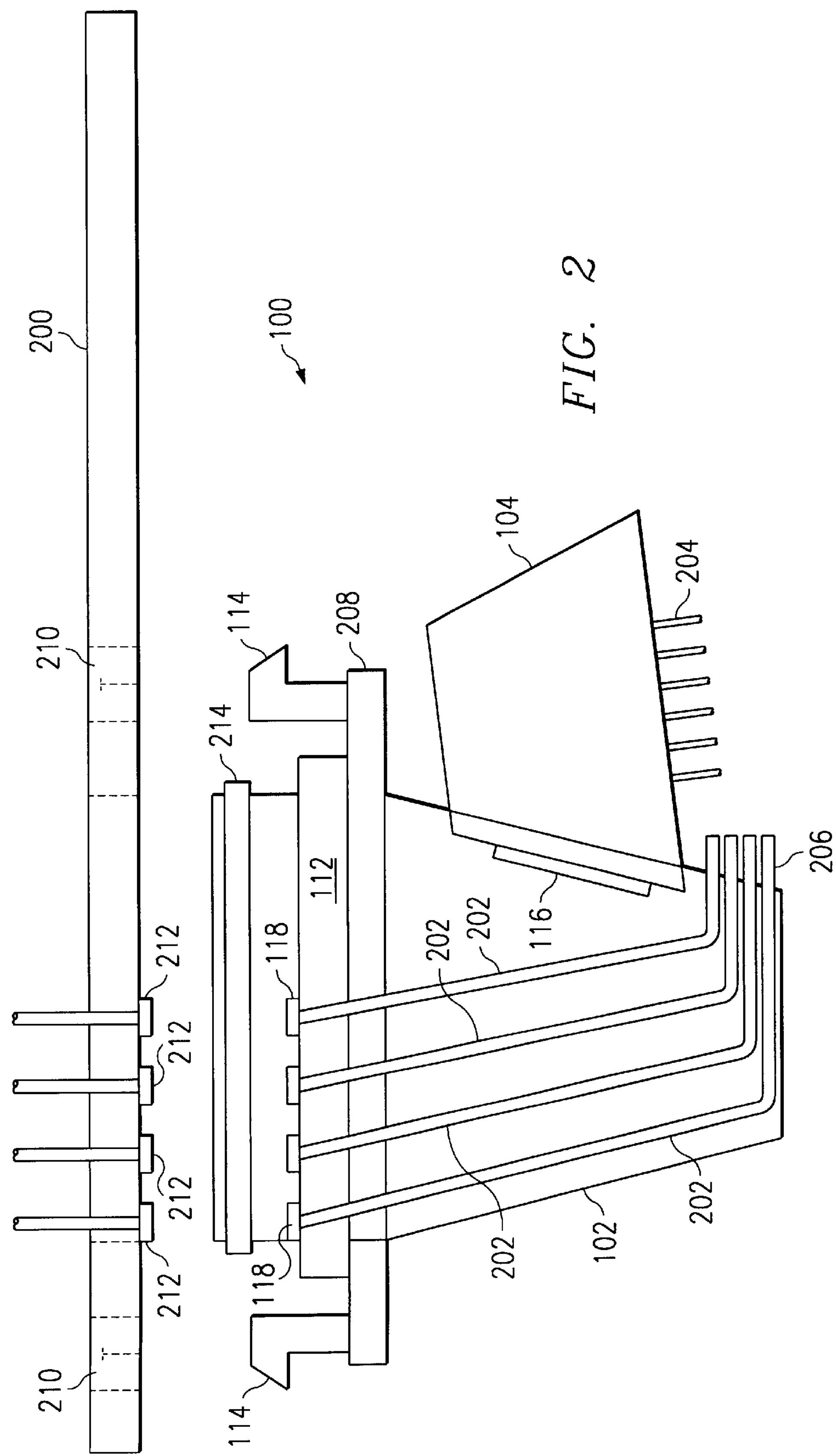
FIG. 2 is an illustrative side view schematic of the dispenser apparatus of FIG. 1.

In FIG. 2, assembly 100 is shown in relation to base plate 200. For purposes of illustration, plate 200 is shown as a separate entity although, in practice, plate 200 will be the surface on a dispensing unit to which nozzle 102 is attached. Assembly 100 further comprises one or more leads 202, which couple conductor members 118 to electrical connections 204 on sensor 104. As shown, leads 202 are disposed within flange 112 and the outer surface of nozzle 102. This is generally desirable for electrical integrity or aesthetics. Depending upon the particular configuration of the sensor 104 and the conductors 118, however, other placements of the leads 202 may be utilized. On the side of nozzle 102 closest to connections 204, leads 202 forms pins 206 to which connections 204 are electrically coupled. This coupling may be achieved by providing a short jumper (with a socket on each end) between pins 206 and connections 204, or by hard wiring pins 206 and connections 204 together. This coupling, as well as the entire sensor 104, may be encased or covered with plastic or other suitable material for electrical integrity or aesthetic purposes.

As depicted in FIG. 2, locking members 114 are disposed upon an attachment member 208. Member 208 is coupled to nozzle 102 and laterally disposed under flange 112. Assembly 100 is matably engaged with and secured to base 200 by inserting locking members 114 into attachment receptacles 210 formed within base 200. This engagement may take the form of a twist lock or snap lock configuration, or some other suitable contrivance depending on particular design constraints. One or more base conducting members 212 are disposed upon the lower surface of base 200. Base conductors 212 may be of similar configuration to, and formed in similar fashion as, conductors 118. Base conductors 212 are electrically coupled to sensor processing systems disposed somewhere within the central housing of the entire dispensing unit. Conductors 118 are disposed upon assembly 100 such that as assembly 100 is attached or secured to base 200, conductors 118 are brought into communicative contact with conductors 212, establishing electrical interconnection between sensor 104 and sensor processing systems disposed somewhere within the dispensing unit. Assembly 100 may include an O-ring 214, made of rubber or some other suitable material, disposed around the upper perimeter of nozzle 102 to ensure that no liquid leaks out onto the interconnections.

As depicted in FIG. 2, assembly 100 and base plate 200 are configured such that nozzle 102 can be oriented only in one direction, the direction which brings conductors 118 into alignment and contact with conductors 212. This may be achieved by irregular spacing of locking members 114, asymmetrical shaping of nozzle 102 and its receptacle within base plate 200, or any other suitable means. Attachment member 208 may comprise a locking ring that locks members 114 into place within receptacles 210 once assembly 100 is inserted into base plate 200. The locking ring is simply twisted a few degrees to connect or disconnect assembly 100.

As such, the present invention integrates electrical conductors into a dispenser apparatus such that electrical interconnection between a sensor in that apparatus and a remote sensor processing system is achieved as the dispenser apparatus is attached to a dispensing unit. Thus, electrical connection is engaged and disengaged concurrent with attachment and detachment of the dispensing apparatus, respectively.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. The principles of the present invention are practicable in a number of applications and technologies. It is therefore intended that the appended claims encompass any such modifications or embodiments.

What is claimed is:

1. A method of electrically interconnecting a sensor in a beverage dispensing apparatus to a sensor control system contained within a separate unit, comprising the steps of:

providing a surface on said separate unit adapted to matably engage the beverage dispensing apparatus;

providing a first conductor member disposed on said surface;

providing a second conductor member disposed on said beverage dispensing apparatus such that as said beverage dispensing apparatus is matably engaged with said surface the first and second conductor members are brought into communicative contact;

providing a unitary lead encased within a surface of said beverage dispensing apparatus and coupling the second conductor member to said sensor; and engaging said beverage dispensing apparatus with said surface.

2. The method of claim 1 wherein the step of providing a first conductor member further comprises encasing the first conductor member within said surface.

3. The method of claim 1 wherein the step of providing a second conductor member further comprises encasing the second conductor member within an upper surface of the beverage dispensing apparatus.

4. The method of claim 1 wherein the step of providing a first conductor member further comprises forming the first conductor member upon said surface.

5. The method of claim 1 wherein the step of providing a second conductor member further comprises forming the second conductor member on an upper surface of the beverage dispensing apparatus.

6. The method of claim 1 wherein the step of providing a surface on said separate unit further comprises providing a selective alignment for matably engaging the beverage dispensing apparatus with said surface.

7. The method of claim 1 wherein the steps of providing the first and second conductor members further comprise providing conductors in a nail head configuration.

8. A beverage sensor electrical interconnection system comprising:

a sensor in a beverage dispensing apparatus;

a base plate adapted to matably engage the beverage dispensing apparatus;

a first conductor member disposed on the base plate;

a second conductor member disposed on the beverage dispensing apparatus such that as the beverage dispensing apparatus is matably engaged with the base plate, the first and second conductor contact one another; and a unitary lead encased within a surface of said beverage dispensing apparatus and coupling the second conductor member to said sensor.

9. The system of claim 8 wherein the base plate is adapted to selectively align the beverage dispensing apparatus during engagement.

10. The system of claim 8 wherein the first and second conductor members are of a nail head configuration.

11. A method of electrically interconnecting a sensor in a beverage dispensing apparatus to a sensor control system contained within a separate unit concurrent with attachment of said beverage dispensing apparatus to said separate unit, comprising the steps of:

providing locking members disposed on said beverage dispensing apparatus;

providing a base plate on said separate unit having receptacles adapted to matably engage and align the beverage dispensing apparatus;

providing a plurality of base plate conductor members, disposed on the lower surface of said base plate and electrically coupled to said sensor control system;

providing a plurality of dispenser apparatus unitary conductor members, electrically coupled to said sensor and disposed on an upper surface of said beverage dispensing apparatus such that as said beverage dispensing apparatus is matably engaged with said base plate the base plate conductor members and the dispenser apparatus unitary conductor members are brought into alignment and communicative contact; and engaging said beverage dispensing apparatus with base plate.

* * * * *